US012627583B2

(12) United States Patent
Connors, Jr. et al.

(10) Patent No.: US 12,627,583 B2
(45) Date of Patent: May 12, 2026

(54) PROMOTION MODE FOR UNINTERRUPTED UPGRADES OF A DATAPLANE

(71) Applicant: Cisco Technology, Inc., San Jose, CA (US)

(72) Inventors: Stephen Craig Connors, Jr., Nashville, TN (US); Mili Anand Taggarsi, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 18/642,481

(22) Filed: Apr. 22, 2024

(65) Prior Publication Data

US 2025/0392529 A1     Dec. 25, 2025

Related U.S. Application Data

(60) Provisional application No. 63/516,448, filed on Jul. 28, 2023.

(51) Int. Cl.
| | |
|---|---|
| *H04L 45/24* | (2022.01) |
| *G06F 9/54* | (2006.01) |

(Continued)

(52) U.S. Cl.
CPC .............. *H04L 43/08* (2013.01); *G06F 9/544* (2013.01); *H04L 41/082* (2013.01); *H04L 43/04* (2013.01)

(58) Field of Classification Search
CPC ....... H04L 43/08; H04L 41/082; H04L 43/04; G06F 9/544

(Continued)

(56) References Cited

U.S. PATENT DOCUMENTS

| | | | |
|---|---|---|---|
| 9,600,263 | B2 | 3/2017 | Stolarchuk et al. |
| 2018/0241627 | A1* | 8/2018 | Rodrigues ........... H04L 41/0813 |

(Continued)

FOREIGN PATENT DOCUMENTS

| | | |
|---|---|---|
| EP | 2907025 B1 | 4/2018 |
| EP | 3695565 B1 | 9/2021 |
| WO | 2023014940 A1 | 2/2023 |

OTHER PUBLICATIONS

European Search Report for European Application No. 25152550.7, dated Apr. 11, 2025, 10 Pages.

*Primary Examiner* — Jude Jean Gilles
(74) *Attorney, Agent, or Firm* — Polsinelli P.C.

(57) ABSTRACT

A system and method are provided for implementing a network component, such as a software-defined wide area network, a firewall, a router, or a load balancer. The network component can be an embedded network edge device that is implemented, e.g., in software, in circuitry, or using hardware acceleration (e.g., a data processing unit (DPU), a smart network interface card (SmartNIC), etc.). The system can a primary (first) dataplane and a shadow (second) dataplane. During verification testing, the network function (e.g., routing) is performed by transmitting the egress packets from the primary (first) dataplane, but using the egress packets from the shadow (second) dataplane only for verification testing. After verification testing, the shadow (second) dataplane is promoted to be a new primary dataplane by gradually increasing the ratio of the output packets that originate from the new primary (second) dataplane until all output packets originate from the second dataplane.

20 Claims, 10 Drawing Sheets

(51) Int. Cl.
    *H04L 41/082*     (2022.01)
    *H04L 43/04*     (2022.01)
    *H04L 43/08*     (2022.01)
    *H04L 45/80*     (2022.01)

(58) Field of Classification Search
    USPC ......................................................... 709/224
    See application file for complete search history.

(56)              References Cited

U.S. PATENT DOCUMENTS

| | | |
|---|---|---|
| 2021/0117249 A1 | 4/2021 | Doshi et al. |
| 2022/0086091 A1 | 3/2022 | Rosenberg et al. |
| 2022/0191248 A1 | 6/2022 | Pieczul et al. |
| 2023/0061613 A1 | 3/2023 | Cardozo et al. |
| 2023/0123775 A1 | 4/2023 | Sivakumar et al. |

* cited by examiner

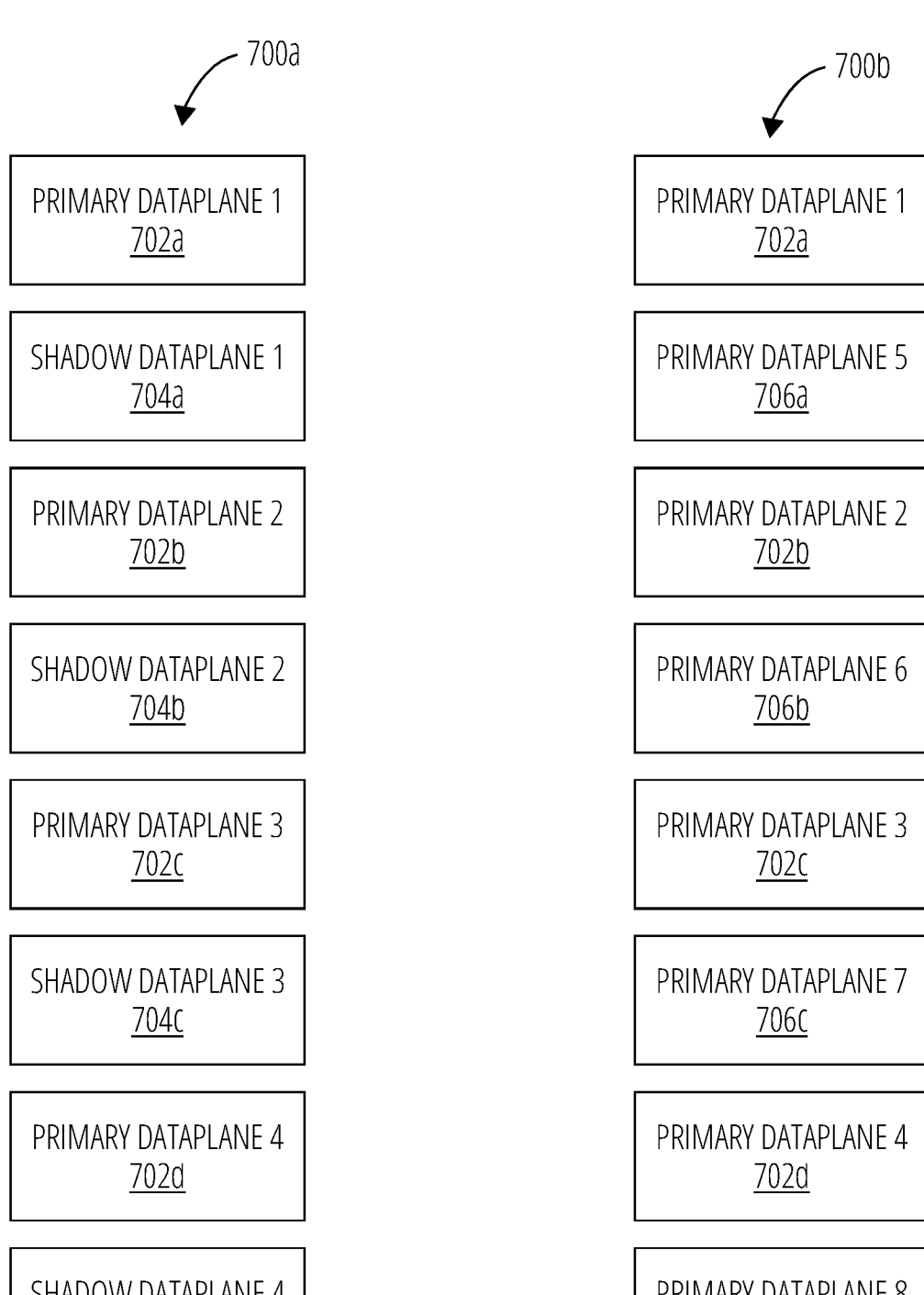
FIG. 7A                    FIG. 7B

800

RECEIVE INGRESS DATA PACKETS AT A NETWORK COMPONENT/DEVICE AND PERFORM A NETWORK FUNCTION ON THE INGRESS DATA PACKETS TO GENERATE TRANSMITTED EGRESS DATA PACKETS (E.G., THE NETWORK COMPONENT CAN INCLUDE DUAL DATAPLANES WITH A FIRST (PRIMARY) DATAPLANE AND A SECOND (SHADOW) DATAPLANE, 802

SELECT, USING A PACKET DISPATCHER, WHICH OF THE RECEIVED INGRESS DATA PACKETS ARE DIRECTED RESPECTIVELY TO THE FIRST AND SECOND DATA PLANES (E.G., IN THE VERIFICATION MODE MATCHING SETS OF INGRESS DATA PACKETS ARE SENT TO THE FIRST AND SECOND DATAPLANES, BUT IN THE SCALE-OUT MODE DIFFERENT SETS OF INGRESS DATA PACKETS ARE SENT TO THE FIRST AND SECOND DATAPLANES) 804

EACH OF THE DATAPLANES PROCESSES THE SELECTED INGRESS DATA PACKETS USING THE LOGICAL INSTRUCTIONS CORRESPONDING TO THE RESPECTIVE DATAPLANE (E.G., IN THE VERIFICATION MODE THE FIRST LOGICAL INSTRUCTIONS OF THE FIRST DATAPLANE CAN BE CURRENT POLICIES/PROGRAMS, WHEREAS THE SECOND LOGICAL INSTRUCTIONS PERFORMED BY THE SECOND DATAPLANE CAN BE UPGRADES TO THE POLICIES/PROGRAMS) 806

GENERATE FIRST (SECOND) EGRESS DATA PACKETS AS A RESULT OF THE FIRST (SECOND) DATAPLANE PROCESSING THE FIRST (SECOND) INGRESS DATA PACKETS USING THE FIRST (SECOND) LOGICAL INSTRUCTIONS 808

SELECT TRANSMITTED EGRESS DATA PACKETS FROM BETWEEN THE FIRST EGRESS DATA PACKETS AND THE FIRST EGRESS DATA PACKETS 810

TRANSITION FROM THE VERIFICATION MODE TO A NON-VERIFICATION MODE (E.G., NORMAL MODE OR SCALE-OUT MODE) BY, SWITCHING, OVER A PREDEFINED PERIOD, FROM SELECTING THE FIRST EGRESS DATA PACKETS AS THE TRANSMITTED EGRESS DATA PACKETS TO SELECTING THE SECOND EGRESS DATA PACKETS AS THE TRANSMITTED EGRESS DATA PACKETS 812

MONITOR, THE TRANSITION FOR POTENTIAL PROBLEMS, AND, WHEN A POTENTIAL PROBLEM OCCURS, ROLL BACK TO THE TRANSMITTED EGRESS DATA PACKETS BEING SELECTED ENTIRELY FROM THE FIRST EGRESS DATA PACKETS 814

FIG. 8

PROMOTION MODE FOR UNINTERRUPTED UPGRADES OF A DATAPLANE

CROSS-REFERENCE TO RELATED APPLICATIONS

This application priority to U.S. provisional application No. 63/516,448, titled "Data Processing Units (DPUs) and extended Berkley Packet Filters (eBPFs) for Improved Security," and filed on Jul. 28, 2023, which is expressly incorporated by reference herein in its entirety.

TECHNICAL FIELD

Aspects described herein generally relate to promoting a shadow dataplane executing a program or policy upgrade to a primary dataplane upon completion of verification testing of the upgrade, and, including, aspects related to upgrading the data plane of network components using a dual dataplane architecture.

BACKGROUND

In a computer network, many network functions can be performed by an edge device performing edge computing. For example, an edge device can provide an entry point into enterprise or service provider core networks. Examples of network devices can include routers, routing switches, integrated access devices (IADs), multiplexers, and a variety of metropolitan area network (MAN), and wide area network (WAN) access devices. Edge devices can also provide connections to carrier and service provider networks.

Consider, for example, a case in which the edge device is a router. For backbone and core networks, the edge device can provide authenticated access (e.g., point-to-point protocol over an asynchronous transfer mode network (PPPoA) or point-to-point protocol over ethernet (PPPoE)). Further, edge routers can include quality of service (QoS) and multi-service functions to manage different types of traffic. Network functions performed by network components can include switching that uses routing protocols such as Open Shortest Path First (OSPF) or Multiprotocol Label Switching (MPLS) for reliability and scalability. Further, Border Gateway Protocol (BGP) routers can be used for peering exchanges.

Edges devices can include a control plane and a dataplane. For example, a software-defined wide area network (SD-WAN) can include separate orchestration, management, control, and data planes. The orchestration plane can assist in the automatic onboarding of the SD-WAN routers into the SD-WAN overlay. The management plane can provide the central configuration and monitoring. The control plane can build and maintain the network topology and make decisions on where traffic flows. The data plane can forward packets based on decisions from the control plane.

Network edge devices including the dataplane can be upgraded throughout time to improve functioning or address vulnerabilities. For example, the network device can be shut down while the dataplane is upgraded, but this results in an interruption of services provided by the network device, which is disruptive to users. Upgrading embedded devices at the network edge can present several challenges.

Accordingly, improved methods and systems are desired for upgrading network edge devices. For example, improvements are desired that allow for seamless upgrades that are not disruptive to users of the network.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7A illustrates a block diagram of an example of a configuration of pairwise primary and shadow dataplanes when there are eight total dataplanes, in accordance with certain embodiments.

FIG. 7B illustrates a block diagram of an example of a scale-out configuration with eight dataplanes, in accordance with certain embodiments.

FIG. 8 illustrates a flow diagram for an example of a method of promoting an upgrade in a network component, in accordance with certain embodiments.

DESCRIPTION OF EXAMPLE EMBODIMENTS

Figure 1A:
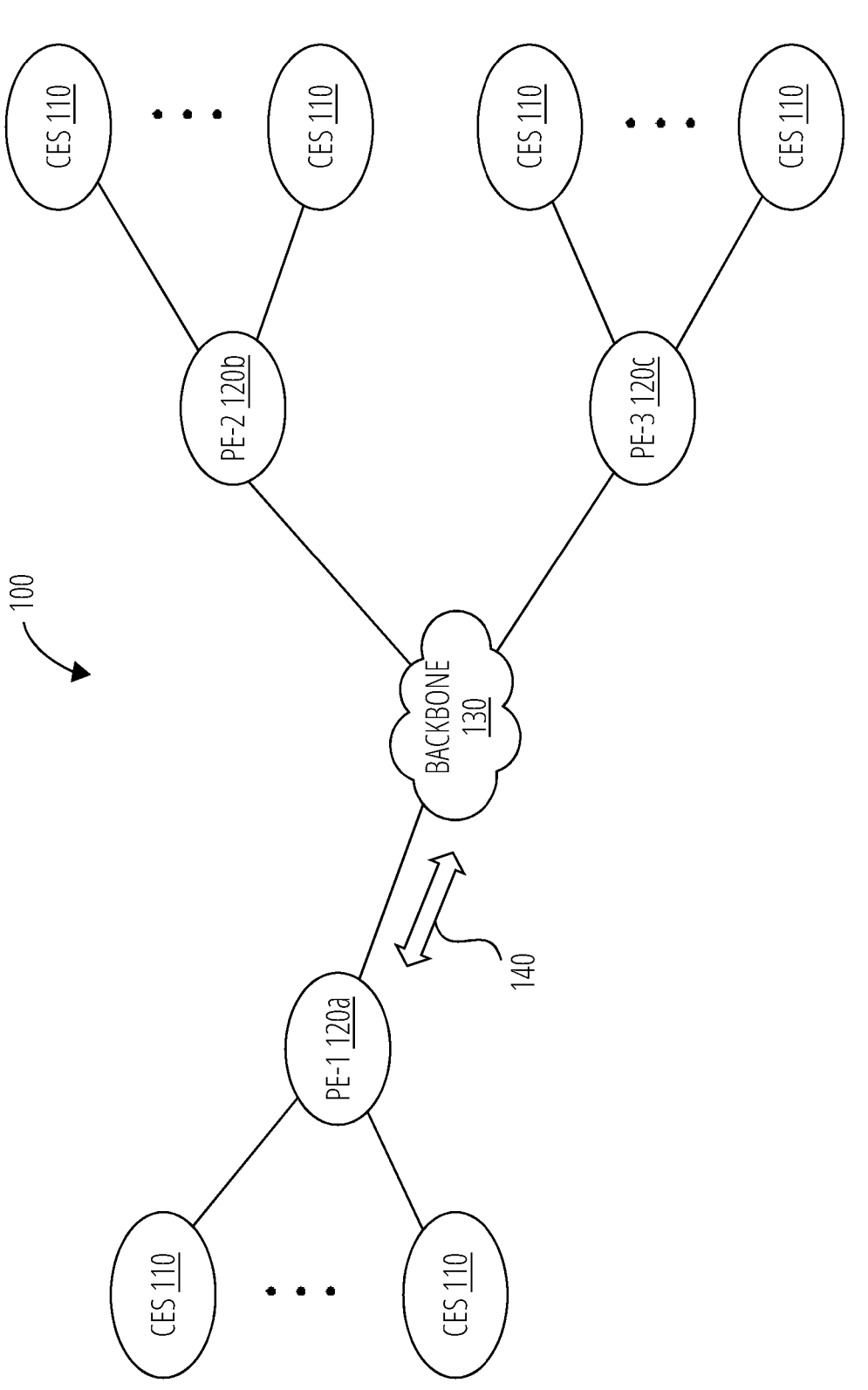
FIG. 1A illustrates a block diagram of a first example of a network, in accordance with certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some aspects, the techniques described herein relate to a method of transitioning a mode of a network component to promote an update from a shadow dataplane to a primary dataplane, the method including: receiving ingress data packets at a network component and performing a network function on the ingress data packets to generate transmitted egress data packets, wherein the network component includes a first dataplane and a second dataplane, the first dataplane being configured to perform the network function by executing first logical instructions on first ingress data packets to provide first egress data packets, and the second dataplane being configured to perform the network function by executing second logical instructions on second ingress data packets to provide second egress data packets; selecting the transmitted egress data packets from between the first egress data packets and the second egress data packets; transmitting the transmitted egress data packets from the network component to another network component; and transitioning from a verification mode to a non-verification mode by, selecting, when in the verification mode, the first egress data packets as the transmitted egress data packets, and switching, over a predefined period, from selecting the first egress data packets as the transmitted egress data packets to selecting the second egress data packets as the transmitted egress data packets.

In some aspects, the techniques described herein relate to a method including: receiving ingress packets at a network component that performs a network function to generate output packets, the network component comprising a first dataplane and a second dataplane, wherein the first dataplane executes first instructions on first ingress packets to provide packets egressing from the first dataplane, the second dataplane executes second instructions on second ingress packets to provide packets egressing from the second dataplane, and, when in a verification mode, the first dataplane is a primary dataplane and the second dataplane is a shadow dataplane; selecting the output packets from the packets egressing from the first dataplane and the packets egressing from the second dataplane, wherein, when in a verification mode, the output packets egress from the primary dataplane; transmitting the output packets; and transitioning from a verification mode to a non-verification mode by gradually increasing, over a transition period, a portion of the output packets that egress from the second dataplane.

In some aspects, the techniques described herein relate to a method, wherein transitioning from the verification mode to the non-verification mode includes: gradually increasing a ratio of the transmitted egress data packets that are selected from the second egress data packets.

In some aspects, the techniques described herein relate to a method, wherein, while transitioning from the verification mode to the non-verification mode, the method further includes: selecting, by a packet dispatcher, the first ingress data packets from the received ingress data packets; and selecting, by the packet dispatcher, the second ingress data packets from the received ingress data packets, wherein the first ingress data packets provide an identical data flow as the second ingress data packets.

In some aspects, the techniques described herein relate to a method, wherein, after transitioning from the verification mode to the non-verification mode, all of the transmitted egress data packets have been processed by the network function being performed using second logical instructions, and, before transitioning from the verification mode to the non-verification mode, all of the transmitted egress data packets have been processed by the network function being performed using first logical instructions.

In some aspects, the techniques described herein relate to a method, wherein, after transitioning from the verification mode to the non-verification mode, the first dataplane operates as a shadow dataplane and the second dataplane operates as a primary dataplane; and, before transitioning from the verification mode to the non-verification mode, the first dataplane operates as the primary dataplane and the second dataplane operates as the shadow dataplane.

In some aspects, the techniques described herein relate to a method, wherein, after transitioning from the verification mode to the non-verification mode, the network component operates in a normal mode as the non-verification mode by: ceasing to process data packets in the shadow dataplane.

In some aspects, the techniques described herein relate to a method, wherein, after transitioning from the verification mode to the non-verification mode, the network component operates in a scale-out mode by: reconfiguring the first dataplane to perform the network function using the second logical instructions, rather than the first logical instructions; selecting, by a packet dispatcher, the first ingress data packets from the received ingress data packets; and selecting, by the packet dispatcher, the second ingress data packets from the received ingress data packets, wherein the first ingress data packets are different from the second ingress data packets; and selecting both the first egress data packets and the second egress data packets as the transmitted egress data packets, thereby increasing throughput through the network component relative to when in the verification mode.

In some aspects, the techniques described herein relate to a method, wherein transitioning from the verification mode to the non-verification mode is performed without interrupting a data-traffic flow of transmitting the transmitted egress data packets from the network component to the another network component.

In some aspects, the techniques described herein relate to a method, further including: monitoring, over the predefined period, the transmitted egress data packets for a deviation from a predefined specification; and rolling back to the transmitted egress data packets being selected entirely from the first egress data packets, when the deviation from the predefined specification is detected.

In some aspects, the techniques described herein relate to a method, wherein the network component is either implemented on one or more data processing units (DPUs) or implemented as software executed on one or more central processing units (CPUs), and the network function includes data-packet filtering, load balancing, security screening, malware detection, firewall protection, data-packet routing, data-packet switching, data-packet forwarding, computing header checksums, or implementing network policies.

In some aspects, the techniques described herein relate to a method, wherein: the network component is configured in an embedded device of a network edge; the network component includes instructions executed in a data processing unit (DPU) or an extended Berkley packet filter.

In some aspects, the techniques described herein relate to a method, wherein: the first logical instructions include a first network policy, and the second logical instructions include an update to the first network policy, or the first logical instructions include software for executing the network function, and the second logical instructions include an upgrade to the software for executing the network function, In some aspects, the techniques described herein relate to a network component including: a first dataplane; a second dataplane; a processor; and a memory storing instructions that, when executed by the processor, configure the network component to: receive ingress data packets at the network component and perform a network function on the ingress data packets to generate transmitted egress data packets, wherein the first dataplane is configured to perform the network function by executing first logical instructions on first ingress data packets to provide first egress data packets, and the second dataplane is configured to perform the network function by executing second logical instructions on second ingress data packets to provide second egress data packets; select the transmitted egress data packets from between the first egress data packets and the first egress data packets; transmit the transmitted egress data packets from the network component to another network component; and transitioning from a verification mode to a non-verification mode by, selecting, when in the verification mode, the first egress data packets as the transmitted egress data packets, and switching, over a predefined period, from selecting the first egress data packets as the transmitted egress data packets to selecting the second egress data packets as the transmitted egress data packets.

In some aspects, the techniques described herein relate to a network component, wherein the instructions further configure the network component to: transition from the verification mode to the non-verification mode by gradually increasing a ratio of the transmitted egress data packets that are selected from the second egress data packets.

In some aspects, the techniques described herein relate to a network component, further including: a packet dispatcher, wherein the instructions further configure the network component to transition from the verification mode to the non-verification mode by: selecting, by a packet dispatcher, the first ingress data packets from the received ingress data packets; and selecting, by the packet dispatcher, the second ingress data packets from the received ingress data packets, wherein the first ingress data packets provide an identical data flow as the second ingress data packets.

In some aspects, the techniques described herein relate to a network component, wherein, after transitioning from the verification mode to the non-verification mode, the first dataplane operates as a shadow dataplane and the second dataplane operates as a primary dataplane; and, before transitioning from the verification mode to the non-verification mode, the first dataplane operates as the primary dataplane and the second dataplane operates as the shadow dataplane.

In some aspects, the techniques described herein relate to a network component, wherein the instructions further configure the network component to: operate the network component in a scale-out mode by: reconfiguring the first dataplane to perform the network function using second logical instructions, rather than the first logical instructions; selecting, by a packet dispatcher, the first ingress data packets from the received ingress data packets; and selecting, by the packet dispatcher, the second ingress data packets from the received ingress data packets, wherein the first ingress data packets are different from the second ingress data packets; and selecting both the first egress data packets and the second egress data packets as the transmitted egress data packets, thereby increasing throughput through the network component relative to when in the verification mode.

In some aspects, the techniques described herein relate to a network component, wherein the instructions further configure the network component to: transition from the verification mode to the non-verification mode without interrupting a data-traffic flow of transmitting the transmitted egress data packets from the network component to the another network component.

In some aspects, the techniques described herein relate to a network component, wherein the instructions further configure the network component to: monitor, over the predefined period, the transmitted egress data packets for a deviation from a predefined specification; and roll back to the transmitted egress data packets being selected entirely from the first egress data packets, when the deviation from the predefined specification is detected.

In some aspects, the techniques described herein relate to a network component, wherein the network component is either implemented on one or more data processing units (DPUs) or implemented as software executed on one or more central processing units (CPUs), and the network function includes data-packet filtering, load balancing, security screening, malware detection, firewall protection, data-packet routing, data-packet switching, data-packet forwarding, computing header checksums, or implementing network policies.

Example Embodiments

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for improvements in upgrading network components. For example, a major challenge facing embedded devices at the network edge is the inability to seamlessly upgrade the embedded devices. These edge-computing devices can include a control plane that controls a dataplane in which data packets are received at various ports, interacted with in some manner (e.g., the packets can be filtered, routed, forwarded, processed through a firewall, etc.), and then transmitted from the various ports, as discussed below.

Generally, upgrading an edge-computing device presents several challenges. First, downtime can result from upgrading the edge-computing device due to device failover and/or route re-convergence. Accordingly, a maintenance window can be scheduled, and the upgrade performed during the maintenance window to allow for the above-noted contingencies. Second, to ensure that the new software or policy does not have negative effects on the network, exhaustive pre-upgrade checks and post-upgrade checks can be performed on the edge-computing device or network component. Third, in case of upgrade failures, a rollback and other contingency plans can be used to rectify the upgrade failures. Fourth, the upgrade can be accompanied by uncertainty about issues in the new version. For example, uncertainty about issues in the new version might not have been identified in quality assurance (QA) checks. In some cases, for example, during the staging/testing phase, the testing environment used to initially verify the new version may be different than the customer's own network on which the new version is ultimately applied (e.g., the production/deployment phase). These differences may be due to unique characteristics of the customer's own network.

The systems and methods disclosed herein address the above-noted challenges by using dual dataplanes, including a primary dataplane and a shadow dataplane. For example, the primary dataplane executes a current version of the software or network policy, and the shadow dataplane executes a new version of the software or network policy. The shadow dataplane is used to perform verification testing of the new version by comparing its performance to that of the current version. Thus, the upgrade can undergo verification testing in the same environment as the current version is operating in (i.e., the customer's own network), thereby eliminating uncertainty about issues in the new version that may not have been identified in QA due to unique characteristics of the customer's own network.

Further, because the new version is verified in the shadow dataplane rather than the primary dataplane, the need for rollback and other contingency plans in case of upgrade failures can be largely mitigated. That is, until the verification testing is complete and the new version is promoted to the primary dataplane, the current version continues to operate in parallel with the new version, and the network functionality continues to be performed by the current version rather than the new version. Then during promotion, which occurs after the new version passes verification testing, the new version can be gradually and gracefully transitioned to assuming the role of the new primary dataplane (i.e., the function of the network device is taken over by the new version). For example, if the new version fails the verification testing, there is no need to roll back to the current version because the current version is still operating to provide the functionality of the edge-computing device, unless and until the new version passes the verification testing. Further, the assurances provided by the pre-upgrade checks and post-upgrade checks can be (largely) integrated into the verification testing. Moreover, because the verification testing occurs in the background and is not disruptive to users, the upgrade can occur at any time rather than during a scheduled maintenance window.

The systems and methods disclosed herein extend many of the advantages of seamless upgrades currently experienced for software as a service (Saas) can be hereby experienced for infrastructure as a service (IaaS) in edge-computing devices and cloud computing environments. For example, in SaaS deployments, the above-noted challenges are largely abstracted away from users, especially the first and third of the above-noted challenges. In SaaS, this is achieved, e.g., by rolling upgrades across multiple containers. Further, in SaaS deployments, the above-noted challenges are largely abstracted away from users by slowly shifting the load from the old version to the new version (e.g., using blue/green deployment) and monitoring the new version. These strategies in SaaS deployments allow continuous integration, continuous deployment (CI/CD) where the SaaS software can be frequently and seamlessly updated in a manner that is invisible to the users.

According to certain non-limiting examples, the systems and methods disclosed herein can achieve CI/CD for infrastructure, edge-computing components (e.g., hardware and software), and embedded edge devices, such that they can be frequently and seamlessly updated in a manner that is non-disruptive to the users (e.g., in ways that are different and/or similar to how this is achieved for SaaS). According to certain non-limiting examples, the systems and methods disclosed herein provide CI/CD in an embedded device that leverages artificial intelligence (AI) to mitigate the four challenges noted above.

According to certain non-limiting examples, the systems and methods disclosed herein use one or more of the following four components:
  1. A Control Plane Agent, which includes control logic representing the status of the dual dataplanes as well as the latest software and/or policy version(s) available (e.g., the current version and the new version);
  2. A Primary Dataplane, which executes/implements the current stable version of software and/or policy;

3. A Shadow Dataplane, which executes/implements an upgrade or new version of software and/or policy; and/or
  4. A Packet Dispatcher, which can provide multiple optional functionalities, including, e.g., a normal mode, a scale-out mode, a verification mode, and a promotion mode.

According to certain non-limiting examples, the systems and methods disclosed herein are configured to operate using the following functionalities, which are performed by one or more of the system components:
  1. Normal Mode—receives packets (e.g., ingress traffic) and then relays/sends the received packets to the primary dataplane, while the shadow dataplane is maintained in a passive/standby configuration;
  2. Scale-out Mode—load balances packets across both dataplanes, e.g., by the packet dispatcher sending different subsets of the received packets to the primary dataplane and the shadow dataplane and using both the primary dataplane and the shadow dataplane to apply the current stable version to the different subsets of the received packets;
  3. Verification Mode—receives packets and sends them to the primary dataplane, and additionally sends identical copies to the shadow dataplane, which applies the new version to these identical copies (e.g., in an embodiment that implements the respective dataplanes in data processing units (DPUs), the packet dispatcher may be part of the DPU itself and not a separate component); and/or
  4. Promotion Mode—once verification is complete, the shadow dataplane can take over as the primary dataplane, and a seamless transition occurs due to the graceful migration of data flows from the "Old Primary" to the "New Primary" dataplane.

Examples of such edge-computing devices can include, but are not limited to, software-defined wide area network (SD-WAN) appliances, firewalls, load balancers, routers, switches, data processing units (DPUs), virtual machines that are implemented on one or more processors (e.g., a central processing unit (CPU)) for performing network functions or implementing network policies, or another component or device implemented at a network edge.

According to certain non-limiting examples, the network edge device can include the following three planes: (i) the dataplane, which processes the transit traffic; (ii) the control plane, which sends and receives control signals to monitor and control the transit traffic; and (iii) the management plane, which interacts with the user or the network management system (NMS).

Consider, for example, the operation of a router as an illustrative network edge device. Interfaces, IP subnets, and routing protocols can be configured through management plane protocols, including, e.g., a command-line interface (CLI), Network Configuration Protocol (NETCONF), and a northbound Representational State Transfer (REST) Application Programming Interface (API). The router runs control plane routing protocols (e.g., Open Shortest Path First (OSPF), Enhanced Interior Gateway Routing Protocol (EIGRP), Border Gateway Protocol (BGP), etc.) to discover adjacent devices and the overall network topology, or to discover reachability information in case of distance/path vector protocols). The router inserts the results of the control-plane protocols into Routing Information Base (RIB) and Forwarding Information Base (FIB). The dataplane software or ASICs, e.g., then use the FIB structures to forward the transit traffic. The management plane protocols (e.g., Simple Network Management Protocol (SNMP)) can then be used to monitor the device operation, its performance, interface counters, etc.

Continuing with the non-limiting example of the network edge device being a router, in addition to controlling the routing protocols, the control plane protocols can also perform numerous other functions including: (i) interface state management (e.g., Point-to-Point Protocol (PPP), Transmission Control Protocol (TCP), and Link Aggregation Control Protocol (LACP)); (ii) connectivity management (e.g., Bidirectional Forwarding Detection (BFD), Connectivity Fault Management (CFM), etc.); (iii) adjacent device discovery (e.g., "hello" mechanisms present in most routing protocols, such as, End System-to-Intermediate System (ES-IS), Address Resolution Protocol (ARP), Internet Protocol version 6 (IPv6_ Neighbor Discovery Protocol (NDP), Universal Plug and Play (UPnP) Simple Service Discovery Protocol (SSDP), etc.); (iv) topology or reachability information exchange (IPv6 routing protocols, Intermediate System to Intermediate System (IS-IS) in Transparent Interconnection of Lots of Links (TRILL) and Shortest Path Bridging (SPB), Spanning Tree Protocol (STP), etc.); and (v) service provisioning (e.g., Resource Reservation Protocol (RSVP) for IntServ or Traffic Engineering (TE) based on Multiprotocol Label Switching (MPLS), uPNP SOAP (Simple Object Access Protocol) calls, etc.).

Still continuing with the non-limiting example of the network edge device being a router, in addition to forwarding packets, the dataplane can also perform the following functions: (i) network address translation (NAT) session creation and NAT table maintenance; (ii) neighbor address gleaning (e.g., dynamic Media Access Control (MAC) address learning in bridging, IPv6 Source Address Validation Improvement (SAVI), etc.); (iii) NetFlow or sampled flow (sFlow) accounting; (iv) network access control list (ACL) logging; and (v) Error signaling, such as Internet Control Message Protocol (ICMP).

According to certain non-limiting examples, the network edge device can perform various network functions including, but not limited to, data-packet filtering, load balancing, security screening, malware detection, firewall protection, data-packet routing, data-packet switching, data-packet forwarding, computing header checksums, or implementing network policies. Security screening can include, but is not limited to, deep packet inspections, analysis of behavioral graphs for detection of cyber attacks and/or malicious software, anomaly detection, cyber-attack signature detection, packet filtering, intrusion prevention systems, extended detection and response, endpoint detection and response, and/or network detection and response functions.

According to certain non-limiting examples, the management and control planes can be implemented in a central processing unit (CPU) or in a data processing unit (DPU). According to certain non-limiting examples, the data plane could be implemented in numerous ways, including, e.g.: (i) as optimized code running on the same CPU as the control plane; (ii) as code running on a dedicated CPU core (e.g., a dedicated CPU for high-speed packet switching, such as a Linux server); (iii) as code running on linecard CPUs (e.g., a CISCO 7200 series router); (iv) as dedicated processors (e.g., network process units (NPUs), data process units (DPUs), smart network interface cards (SmartNICs), etc.); and (v) as switching hardware (application-specific integrated circuits (ASICs), field programable gate arrays (FP-GAs), etc.); and (vi) as switching hardware on numerous linecards.

According to certain non-limiting examples, the dataplane receives and processes the ingress packets. Further, the dataplane can selectively forward packets destined for the router (e.g., Secure Shell (SSH) traffic or routing protocol updates) or packets that need special processing (e.g., IP datagrams with IP options or IP datagrams that have exceeded their TTL) to the control plane.

According to certain non-limiting examples, the management ports on some devices (e.g. data center switches) can be connected directly to a control-plane CPU and thus bypass a switching ASIC.

According to certain non-limiting examples, the control plane can pass outbound packets to the dataplane, or use its own forwarding mechanisms to determine the outgoing interface and the next-hop router (e.g., when using the local policy routing).

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

FIG. 1A is a schematic block diagram of a non-limiting example of a computer network 100 that includes various nodes/devices, such as a plurality of routers/devices interconnected by links or networks. For example, customer edge (CE) routers 110 may be interconnected with provider edge (PE) routers (e.g., PE-1 120*a*, PE-2 120*b*, and PE-3 120*c*)) to communicate across a core network, such as an illustrative network backbone 130. For example, the routers (e.g., CE routers 110, PE routers 120*a*, 120*b*, 120*c*) may be interconnected by the public Internet, a multiprotocol label switching (MPLS), or a virtual private network (VPN). Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics.

According to certain non-limiting examples, a given customer site may fall under one or more of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 120*b* and a second CE router 110 connected to PE-3 120*c*.

Figure 1B:
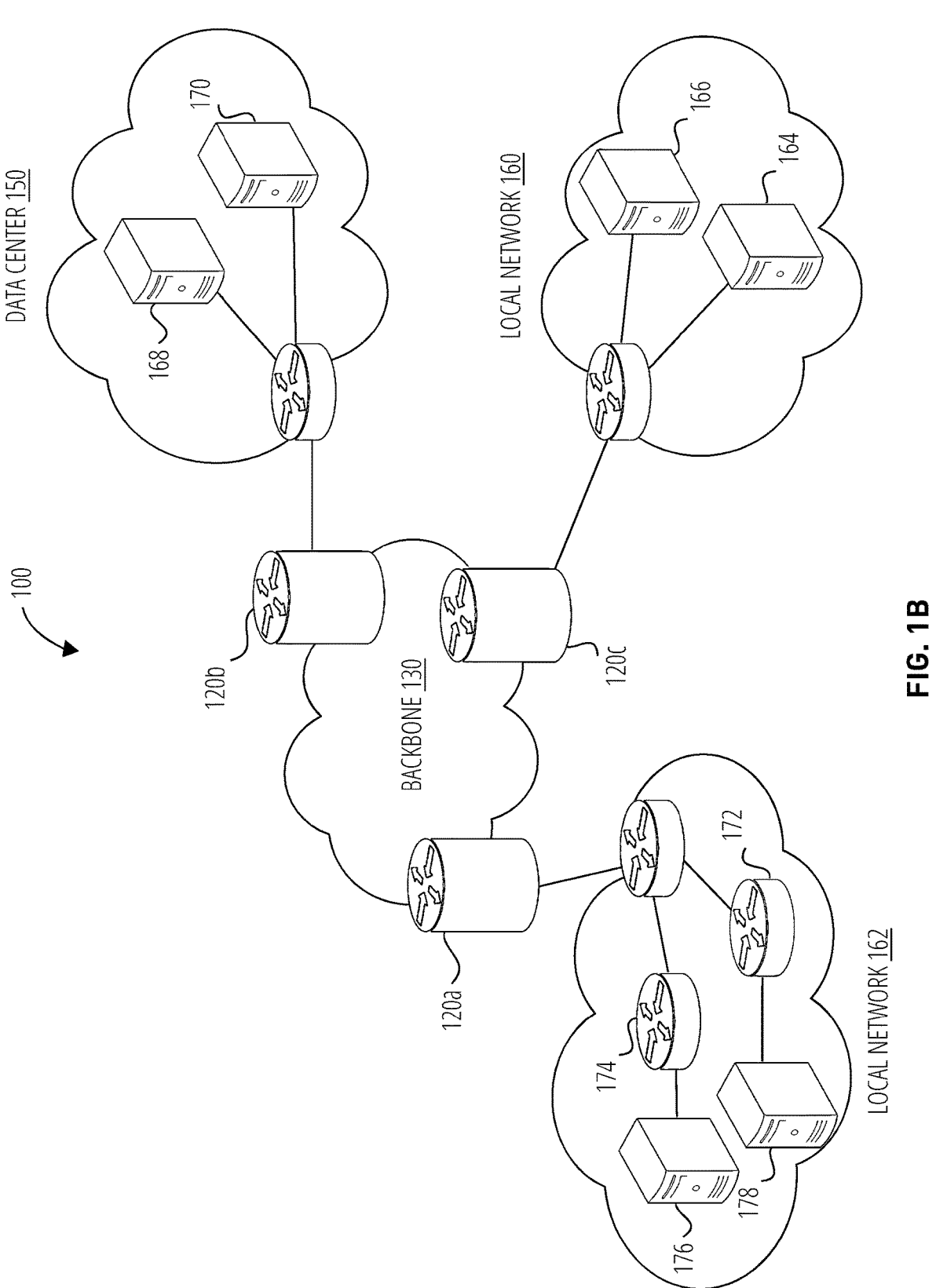
FIG. 1B illustrates a block diagram of a second example of the network, in accordance with certain embodiments.

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160 and 162 that include devices/nodes 172, 174, 176, and 178 and devices/nodes 164 and 166, respectively, as well as a data center 150 that includes servers 168 and 170. Notably, local network 160, local network 162, and data center 150 can be located in different geographic locations.

Server 168 and server 170 can include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

Figure 2:
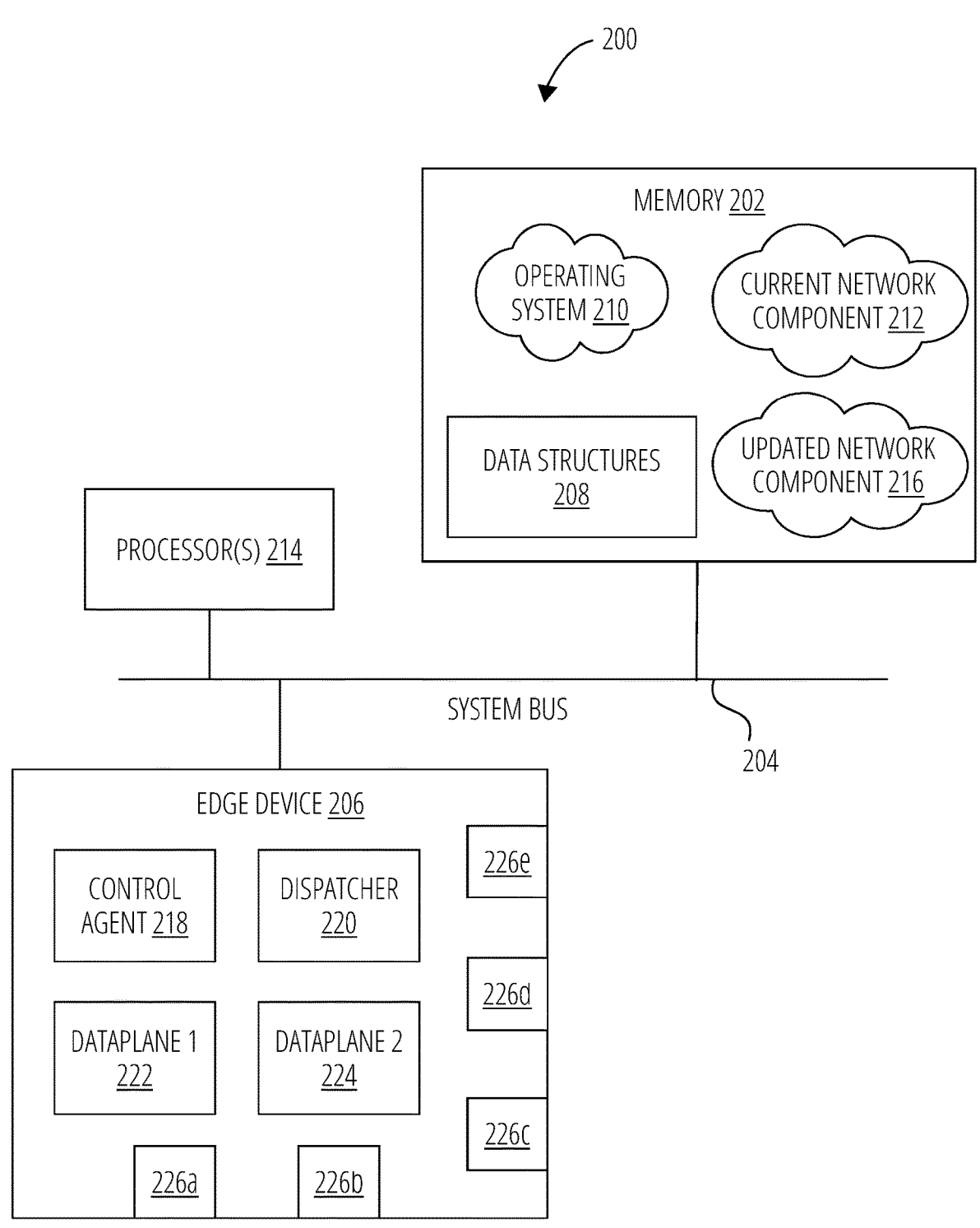
FIG. 2 illustrates a block diagram of a network device, in accordance with certain embodiments.

FIG. 2 is a schematic block diagram of an example node/device 200 (e.g., an apparatus) that may be used with one or more embodiments described herein, e.g., as any of the computing devices shown in FIG. 1A and FIG. 1B, the device 200 may also be any other suitable type of device depending upon the type of network architecture in place, such as IoT nodes, etc. Device 200 can include one or more edge devices 206, one or more processor(s) 214, and a memory 202 interconnected by a system bus 204.

The edge device 206 can include the mechanical, electrical, and signaling circuitry for communicating data over physical links coupled to the network 100. The edge device 206 can be configured to transmit and/or receive data using a variety of different communication protocols. the edge device 206 can also be used to implement one or more virtual network interfaces, such as for virtual private network (VPN) access, known to those skilled in the art. The edge device 206 can be implemented as software executed on a central processing unit (CPU), such as a virtual machine like a Berkley packet filter (BPF) or extended BPF (eBPF) that is configured to implement a network policy, for example. Alternatively or additionally, The edge device 206 can be implemented as a separate piece of hardware (e.g., a data processing unit (DPU), a graphics processing unit (GPU), a smart network interface card (smartNIC), a network interface controller, an application-specific integrated circuit (ASIC), field programable gate array (FPGA), or other device/circuitry configured to perform the function of a network component).

The edge device 206 can be configured to provide one or more network functions, including, e.g., data-packet filtering, load balancing, packet screening, pattern detection for cybersecurity threats, malware detection, firewall protection, data-packet routing, data-packet switching, data-packet forwarding, computing header checksums, or implementing network policies. According to certain non-limiting examples, the edge device 206 can be an embedded device at the network edge. The edge device 206 can include (or be part of) a software-defined wide area network (SD-WAN) appliance, a firewall, or a load balancer, for example. Moreover, the systems and methods disclosed herein can be used with any edge device 206 that includes a dataplane that can be intermittently updated to a new version.

The edge device 206 can include a dataplane, a control plane, and a management plane, as discussed above. Further, instructions implementing the control plane and the management plane can be stored and/or executed in the processor(s) 214. Additionally or alternatively, the edge device 206 can include processors or circuits that implement one or more functions of the control plane and the management plane. The edge device 206 can include a series of ports (e.g., first port 226*a*, second port 226*b*, third port 226*c*, fourth port 226*d*, and fifth port 226*e*). The edge device 206 can also include a control agent 218, a dispatcher 220, a first dataplane 222, and a second dataplane 224.

Memory 202 can include a plurality of storage locations that are addressable by the processor(s) 214 and the edge device 206 for storing software programs and data structures associated with the embodiments described herein. Memory 202 can include various data structures 208 and can include instructions for executing the operating system 210, the current network component 212, and the updated network component 216. The processor(s) 214 can include logic adapted to execute the software programs and manipulate the data structures 208. An operating system 210 (e.g., the Internetworking Operating System, or IOS®, of Cisco Systems, Inc., another operating system, etc.), portions of which can be in memory 202 and executed by the processor(s), functionally organizes the node by, inter alia, invoking network operations in support of software processors and/or services executing on the device.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the function-ality of a similar process). Further, while processes may be shown and/or described separately, those skilled in the art will appreciate that processes may be routines or modules within other processes.

Figure 3:
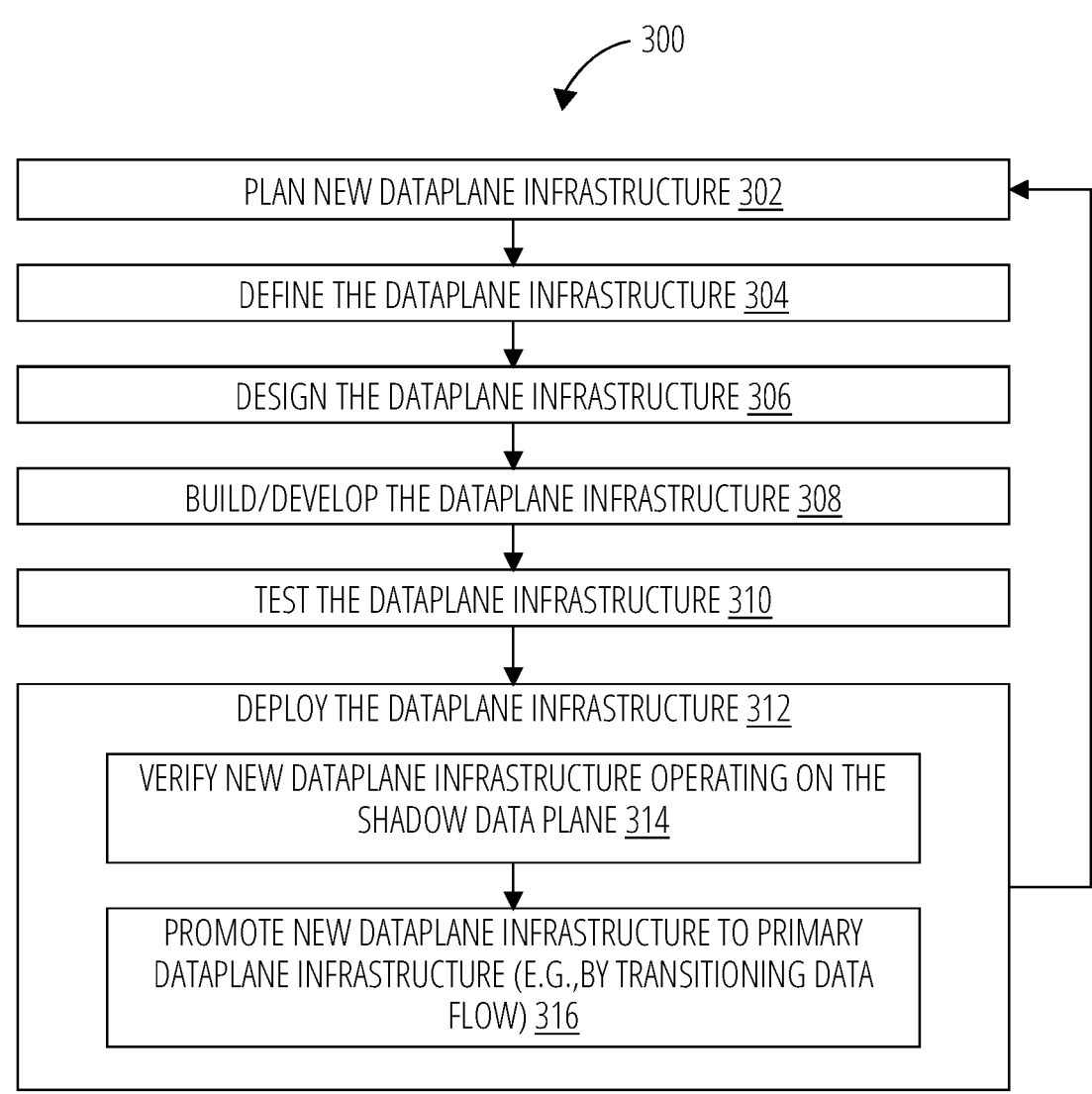
FIG. 3 illustrates a flow diagram for an example of a method of implementing a software development lifecycle (SDLC), in accordance with certain embodiments.

FIG. 3 illustrates an example of method 300 for a software development life cycle (SDLC). Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements method 300 may perform functions at substantially the same time or in a specific sequence.

Method 300 provides a structured process to enable high-quality, low-cost dataplane development in a short period. Method 300 can produce a dataplane infrastructure that meets customer expectations with minimal interruption.

According to some examples, in step 302, the method includes planning new dataplane infrastructure.

According to certain non-limiting examples, step 302 includes planning and requirement analysis. Requirement analysis can be performed by the senior members of the team with inputs from the customer, the sales department, market surveys, and domain experts in the industry. This information can be used to plan the basic project approach based on studies in the economic, operational, and technical areas.

According to some examples, in step 304, the method includes defining the dataplane infrastructure at step 304.

According to certain non-limiting examples, upon completion of the requirement analysis, the product require-ments can be defined and documented. Further, these prod-uct requirements can be approved by the customer or the market analysts. This can be done using a software require-ment specification (SRS) document which consists of all the product requirements to be designed and developed during the project life cycle.

According to some examples, in step 306, the method includes designing the dataplane infrastructure at step 306.

According to certain non-limiting examples, the SRS is used as the reference for product architects to come out with the best architecture for the product to be developed. Based on the requirements specified in SRS. According to certain non-limiting examples, more than one design approach can be proposed for the product architecture is proposed and documented in a DDS—Design Document Specification.

This DDS is reviewed by various stakeholders and a preferred design approach is selected based on various selection criteria (e.g., based on various parameters such as risk assessment, product robustness, design modularity, bud-get, and time constraints). A design approach defines the architectural modules of the product along with its commu-nication and data flow representation with the external and third-party modules (if any).

According to some examples, in step 308, the method includes building/developing the dataplane infrastructure at step 308.

According to certain non-limiting examples, in step 308 the development is performed and the product is built. The programming code is generated as per DDS during this step. Developers follow the coding guidelines defined by their organization and programming tools like compilers, inter-preters, debuggers, etc. are used to generate the code. Different high-level programming languages such as C, C++, Pascal, Java and PHP are used for coding.

According to some examples, in step 310, the method includes testing the dataplane infrastructure at step 310.

According to certain non-limiting examples, step 310 can include parts of all stages of the SDLC cycle, and step 310 can thus be viewed as a subset of all the stages of the SDLC model. Further, some testing activities can be integrated with other stages of the method 300. Once a code commit is ready, testing can proceed by provisioning the code commit in a staging environment that is intended to be representative of how the new version will be used in practice. Then, testing proceeds by measuring various signals to determine that the product/new version functions as desired. Generally, step 310 can include testing the product/new version for defects, bugs, or security vulnerabilities, and then reporting, tracking, fixing, and retesting the defects, bugs, or security vulnerabilities, until the product reaches the quality stan-dards and passes a quality assurance (QA) process.

According to some examples, in process 312, the method includes deploying the dataplane infrastructure at process 312. Process 312 can include step 314 and step 316. In process 312, the new version/product can be deployed by provisioning it in a production environment (e.g., the cus-tomer's own network) and performing additional testing in this environment to ensure that the new version/product by measuring various signals to determine that the product/new version functions as desired.

Figure 4:
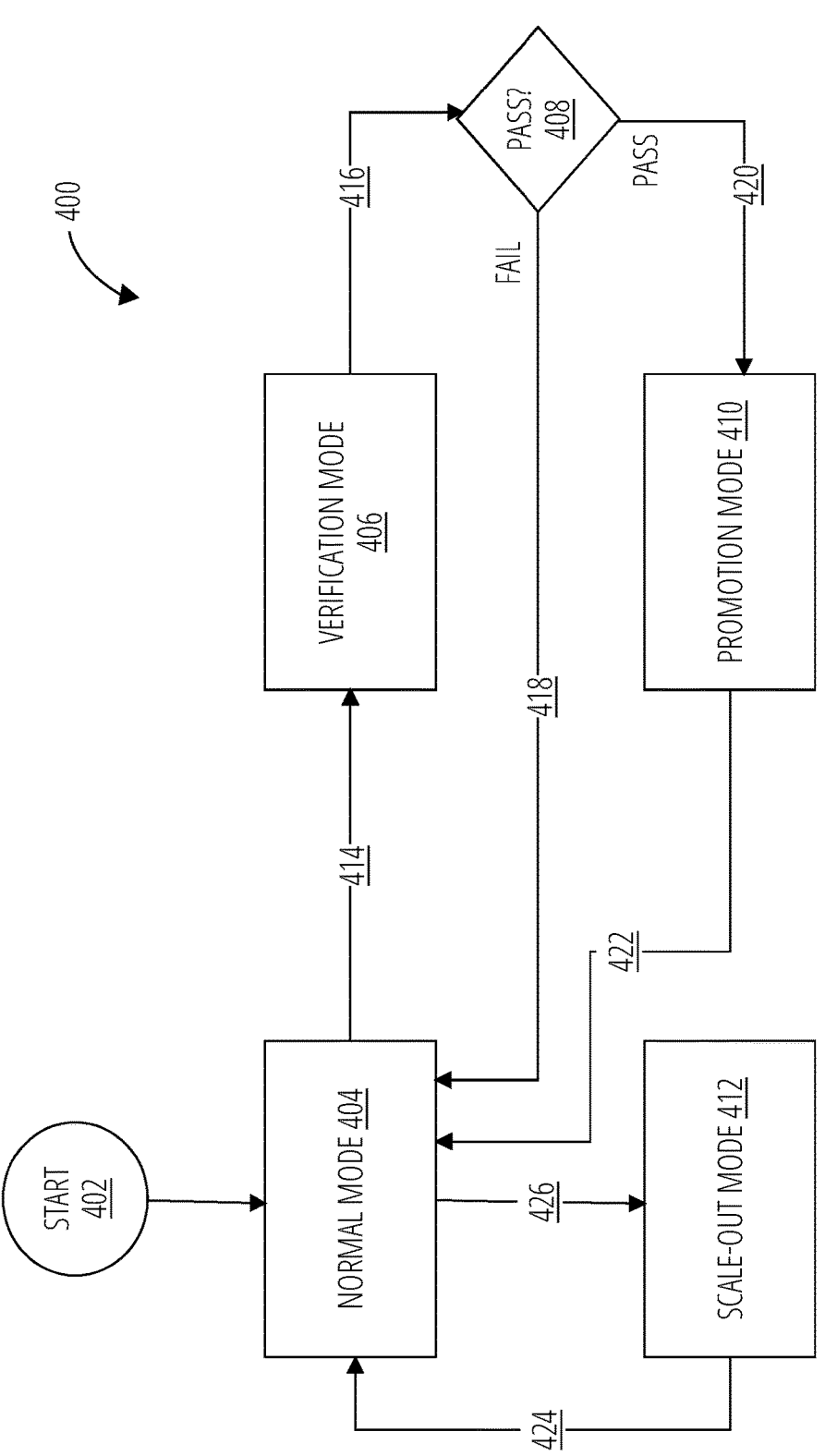
FIG. 4 illustrates a state diagram for an example of a step for deploying a new software/policy version using dual dataplanes, in accordance with certain embodiments.

According to some examples, in step 314, the method includes verifying new dataplane infrastructure operating on the shadow data plane at step 314. According to certain non-limiting examples, step 314 can be performed using verification mode 406 and decision block 408, which are illustrated in FIG. 4 and are described below with reference to FIG. 4.

According to some examples, in step 316, the method includes promoting new dataplane infrastructure to primary dataplane infrastructure (e.g., by transitioning the data flow from the previous primary dataplane to the previous shadow dataplane, which becomes the new primary dataplane). According to certain non-limiting examples, step 316 can be performed using the promotion mode 410, which is illus-trated in FIG. 4 and is described below with reference to FIG. 4.

According to certain non-limiting examples, the verifica-tion process, which is disclosed herein using the shadow dataplane, can replace previous methods of verification testing. Alternatively, the verification process can be com-bined with, rather than replace, previous methods of verifi-cation testing (e.g., step 310) that exist as a normal course of the Software Development Lifecycle (SDLC). For example, code commits can be continuously integrated and tested in a staging environment, and this can occur prior to the use of the verification process, which is based on the shadow dataplane, in a production environment. Once stag-ing-phase testing is complete, the code can be merged into the production branch and pushed into production. For example, the shadow-dataplane-based verification process can provide a unique, non-disruptive way as the last stage of the continuous integration, continuous deployment (CI/CD) promotion pipeline.

Failures (e.g., defects, bugs, or vulnerabilities) detected in the production/deployment testing (i.e., during the verification mode) can indicate a field escape of a bug that was missed during the QA process (e.g., the testing in step 310). Thus, the production/deployment testing (i.e., during the verification mode) provides a way to prevent the bug from negatively impacting production by doing out-of-band verification within the actual production environment (e.g., the customer's own network), but in a manner that is not disruptive and/or is invisible to the customer (e.g., without the disruption of software rollbacks).

Failures (e.g., defects, bugs, or vulnerabilities) detected in the production/deployment testing can be treated as field escapes. Although verification-mode failures do not negatively impact production, they can incur other costs associated with QA field escapes (e.g., delay in getting new code to production, need to reverse engineer the failure, need to augment QA testing in staging to ensure this type of escape does not reoccur). Thus, the verification mode failures can be treated as field escapes by automatically generating bug reports for the team to address in both the software-development phase and staging-test phase (e.g., step 308 and step 310).

FIG. 4 illustrates a non-limiting example of a state diagram 400. According to certain non-limiting examples, step 302 goes from start 402 to the normal mode 404.

In normal mode 404, packets are simply sent through the primary dataplane and processed as normal. The shadow dataplane is in standby, waiting in case a new software and/or policy that needs verification arrives. Generally, there is no way to predict when the new software and/or policy that needs verification will arrive. When a new software and/or policy is ready for verification, a transition from the normal mode 404 to verification mode 406 is signaled by a request 414. When greater packet throughput is requested, a transition from the normal mode 404 to the scale-out mode 412 is signaled by a request 414.

In scale-out mode 412, the idle resources in the shadow dataplane can be put to use for load balancing. In the absence of a shadow dataplane, a mechanism for scale-out of the network edge device is to leverage resources along the application path (e.g., DPU in the server+DPU in the switch). However, there may be cases where a device is overloaded and there is no way to shift load around in the immediate term. When this is the case, additional resources may become temporarily available by switching to scale-out mode 412 to take advantage of the shadow dataplane. Scale-out mode 412 is initiated by a scale-out request 426, and then terminated when there is no longer a need for additional resources, resulting in signal 424 indicating that the normal capacity threshold is maintained.

According to certain non-limiting examples, in scale-out mode 412, any verification testing currently being processed is canceled, and a pause is put on accepting verification testing. The system engages both dataplanes as Active/Active (i.e., the primary dataplane is in an active state and the shadow dataplane is in an active state, rather than standby). Both dataplanes implement a current version of the software/policy. The packet dispatcher load balances packets across the active dataplanes to use all available capacity. For example, in a pure x86 or Advanced RISC Machine (ARM) system, this can be implemented as another pipeline to process packets, spreading the workload across more cores. In a system with DPUs, e.g., this means taking advantage of the additional hardware capacity on the DPUs.

According to certain non-limiting examples, verification mode 406 is triggered by the state machine receiving a verification request while in the normal mode 404. In verification mode 406, packets are mirrored through two versions of the software and/or policy, which are running concurrently. The primary dataplane can be agnostic to the fact that the system is in verification mode and simply functions as it normally would. The shadow dataplane implements the new software and/or policy, and the shadow dataplane drops packets at the end of the pipeline rather than transmitting them. That is, both the primary dataplane and the shadow dataplane receive the exact same packets, making it possible to perform a direct comparison between the performance of the current and new versions of the software/policy. Further, this comparison is performed using the customer's actual traffic, and this comparison is performed transparently, without any impact on the execution of the network.

According to certain non-limiting examples, when sufficient data has been gathered in the verification, signal to check verification results 416 can transition the state machine from verification mode 406 to decision block 408. Alternatively or additionally, decision block 408 can be integrated with verification mode 406 such that there is a continuous or periodic checking of whether the verification criteria have been met, and while this checking is inconclusive additional performance data continues to be accumulated from the primary and shadow dataplanes.

As part of (or separate from) verification mode 406, decision block 408 includes checks to determine, after a specified testing interval, whether the new version passed or failed the verification test(s). If the verification fails, fail signal 418 indicates that the shadow dataplane has not been authorized to take over as the primary dataplane. The system reverts to normal mode 404 without passing through promotion mode 410, and the system sends a message to the controller indicating the cause of the failure. A newer policy or software version is then developed and verification mode 406 is reinitiated using the newer policy or software version. If verification testing passes, the system generates a signal of pass 420 and moves to promotion mode 410.

Once verification mode 406 is complete and the new version has passed the verification, promotion mode 410 is initiated to promote the shadow dataplane to the primary dataplane. Preferably, this promotion is performed gracefully to minimize disruption to the running system. Further, this promotion can be performed gradually, in case a rollback becomes required due to there being any issues that were missed during verification.

According to certain non-limiting examples, in promotion mode 410, the shadow dataplane becomes the "primary pending" dataplane and the packet dispatcher begins forwarding all new flows to the primary pending dataplane. Once these flows are observed to flow normally, existing flows are gracefully migrated from the primary dataplane to the primary pending dataplane until all flows are transiting through the primary pending dataplane. At this point, the previous primary dataplane transitions to the current shadow dataplane, and the primary pending dataplane to the current primary dataplane. Then the signal for the primary and shadow role exchange 422 is triggered, sending the state machine represented in state diagram 400 back to normal mode 404.

Returning to verification mode 406, verification can be predicated on assessing the difference in behaviors of two versions of network software and/or network policies. In many cases, a comparison between the two versions is more involved than merely observing that the performance of the new version matches the performance of the current version. For example, the new version can be expected to perform differently than the current version. For example, the new version might be intended to improve performance in certain aspects relative to the current version. Thus, the comparison between the performances of the two versions can be informed regarding expected differences in performance due to improvements integrated into the new versions, and, in anticipation of these differences, the comparison can set out criteria for the verification testing that account for the expected differences in performance.

In one case that exemplifies a simple verification, the new version of the software is a minor revision to the current software that is limited to optimizing the pipeline to improve performance. In this case, verification can be straightforward because the expected result of the new version of the software is that the same number of packets are received and transmitted, the same policies are matched, the CPU and memory usage are the same or lower, the latency of packets transiting the dataplane is reduced and the effective throughput increased. Thus, basic heuristics can be used to determine whether the new version is an improvement relative to the current version, which would signify a successful verification.

In other cases, however, verification is not as simple as in the above example. In such cases, new versions of software and policy can be accompanied by metadata that can inform the system how to interpret the results of the comparison between performances of the current and new versions to establish predefined criteria for verification.

In these more complicated/non-trivial verification cases, verification criteria can be established for various aspects of the performance comparison. For example, to determine that the new version of the software will not disrupt the network, various factors can be considered for the metrication of the performance when executing a firewall dataplane, including, e.g., CPU performance, memory usage, packet latency, and traffic volume. For example, the predefined verification criteria can include metrics related to changes in the CPU usage, including, e.g., the minimum CPU usage, the maximum CPU usage, and the average CPU usage. Further, the predefined verification criteria can include metrics related to o changes in memory usage, including, e.g., the minimum memory usage, the maximum memory usage, the average memory usage, and memory growth over the verification period. Additionally, the predefined verification criteria can include metrics related to changes in the packet latency, including, e.g., the average time it takes packets to traverse the dataplane.

In addition to the above performance metrics, the predefined verification criteria can include various traffic-volume metrics. These traffic-volume metrics can include, e.g., the total number of packets processed, the number of dropped packets, and the number of packets that are transmitted (i.e., transmitted from the ports to other network devices). In certain verification cases, it is anticipated that traffic volume should be identical at egress, between the primary and shadow dataplanes. For example, if N packets arrived and K packets were dropped due to policy, L packets should be transmitted at the end. For verification to be precise, the exact same number of packets (e.g., N packets) can be ensured on both dataplanes. The exact same number of packets can be ensured, e.g., by sending an inline control packet that signals the start and end of verification. This ensures that both dataplanes are operating on the same N.

Whereas traffic volume should be identical at egress for cases in which the policies or other aspects of the processing do not change the number of dropped packets, in other cases the number of dropped packets can change, but often the number of dropped packets will change in predictable ways, which can be communicated via the accompanying metadata to generate traffic-volume metrics that are indicative of the predicted changes. That is, some versions of software may alter the number of dropped packets (e.g., above K value) for valid reasons.

For instance, in the case that the current version of the software does not properly enforce dropping packets with a specific Internet Control Message Protocol (ICMP) code, but the new version does properly enforce dropping packets with the specific ICMP code. In this case, the new version can be expected to drop more packets than the current version. The percentage change in the number of dropped packets can be learned during the staging phase, and then this learned value can be included in the metadata. When comparing the performances of the primary and shadow dataplanes during verification mode 406, which occurs during the production phase of the SDLC, the metadata can be used to predict a range of acceptable values for the number of dropped packets for the shadow dataplane relative to the primary dataplane, and this predicted range can be one of the verification criteria.

The use of metadata to predict values for verification criteria is not limited to traffic volume, as would be understood by a person of ordinary skill in the art. Generally, verification metadata can be used as part of the upgrade to communicate/train the system about what is going to be different in the new version of the software/policy. For example, the verification metadata indicates what is expected to be different in the new version of the software/policy, such that, in verification mode 406, the expected differences are not treated as verification failures. That is, the verification metadata can inform the decision regarding whether the new version of the software/policy is good (i.e., passes verification testing). The verification metadata can be generated in various ways, including, e.g., by being hard coded by a network operations center (NOC) engineer, a programmer, or a software developer; generated during in-house testing or staging-phase testing; based on product specification documents or expected changes, etc. The system can then use the verification metadata to predict how the new version should perform relative to the current version in order to pass verification testing. For example, the system can include an artificial intelligence (AI) engine that has been trained to predict these differences between the respective performances of the current and new versions of the software/policy.

For example, the ML model can automate many processes and steps for verifying an upgrade to a network component (e.g., a firewall upgrade) for production testing by implementing the verification criteria for verification mode 406 based on the verification metadata.

For example, in the SDLC, various steps and processes can be performed, including, e.g., the pre-production testing, pushing the new version of the software, and then post-upgrade testing. In these processes, a spreadsheet can be used to list various values for the current version and the new version, and these values can be, e.g., the CPU usage, memory usage, and the number of packets. The spreadsheet might further list changes in policies, and so forth. Then, by comparing these sets of values for current and new versions, a determination can be made regarding whether the values for the current and new versions are either the same or the differences are expected/justified.

The ML model can automate the above process by using the verification metadata to predict what differences are expected/justified. The ML model can be integrated with the control-plane agent 508, and the ML model can be trained to predict based on various values in the verification metadata what metrics the new version should meet when operating properly to pass the verification testing.

In addition to the above discussion, policy verification also include some unique aspect with respect to the verification criteria. For example, policy verification can be distinct from software verification because, in many cases, the version of the policies is expected to change the behavior of the system. Thus, the verification criteria for a new version of the policies can include metrics quantifying/ indicating whether the new policy would negatively impact user traffic and whether the new policy effectively delivers the intended outcome. For example, the verification criteria can include one or more metrics quantifying whether the new policy has exposed some deficiency in the system that would negatively impact user traffic (e.g. performance degradation due to high CPU usage). Additionally, the verification criteria can include one or more metrics that assist the administrator in determining whether the policy effectively delivers the outcome that the administrator instituted the new policy to achieve.

Figure 5:
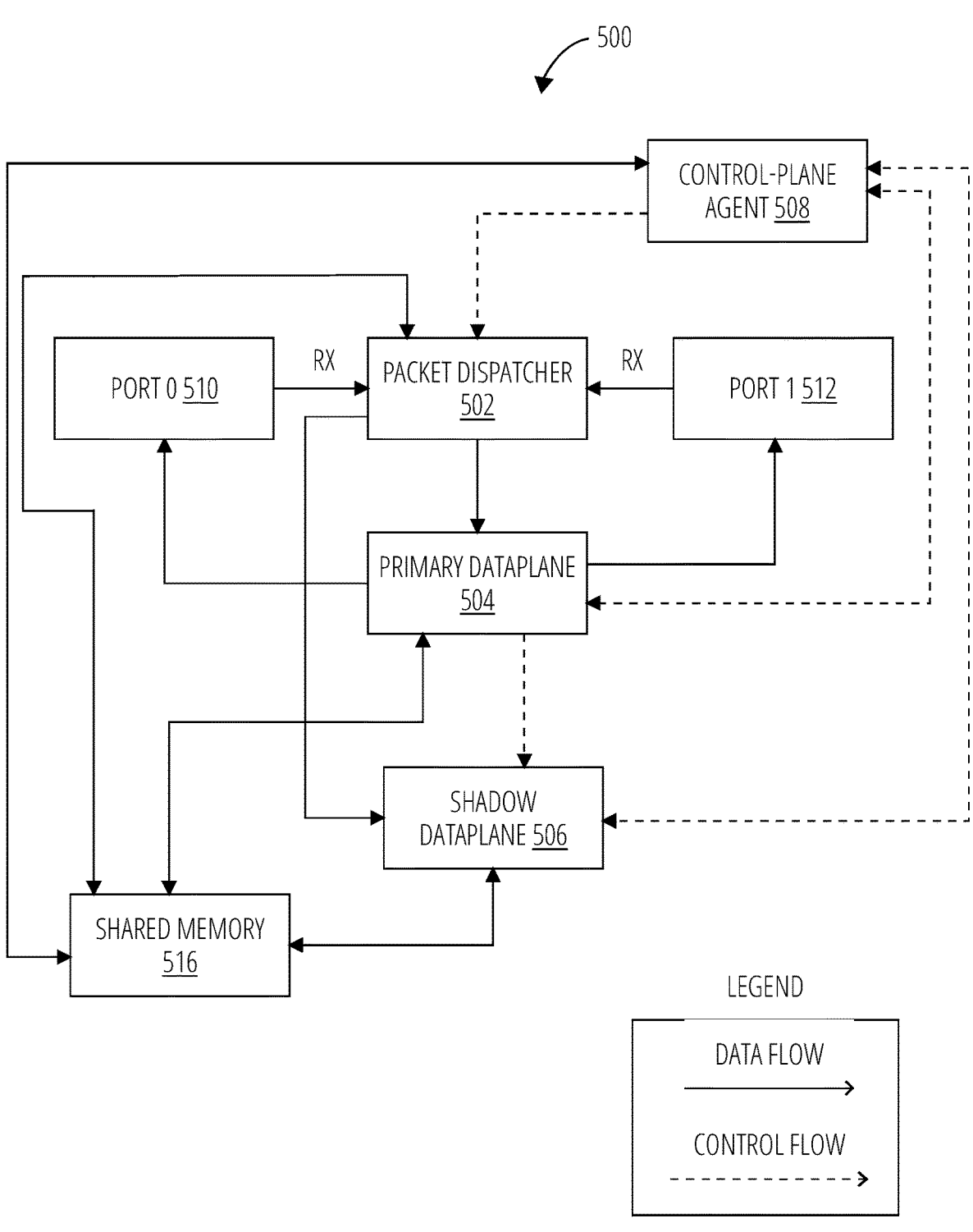
FIG. 5 illustrates a block diagram of a first example of implementing dual dataplanes in data processing units (DPUs), in accordance with certain embodiments.

FIG. 5 illustrates a non-limiting example of a dual dataplane architecture 500 for a network appliance. Another dual dataplane architecture for use with DPUs (i.e., the DPU dual dataplane architecture 600) is presented in FIG. 6. In a physical or virtual machine that does not have access to DPUs, the systems and methods disclosed herein provide the ability to run concurrent dataplanes in parallel in order to support the dual dataplane model of CI/CD upgrades with inline validation.

As illustrated in FIG. 5, ingress packets are received through port 0 510 and port 1 512 to the packet dispatcher 502, and then the packet dispatcher 502 selects which of these data packets to direct to primary dataplane 504 and shadow dataplane 506. For example, in verification mode 406 the packets can be mirrored such that identical replicas are sent to both dataplanes. In contrast, in the scale-out mode 412, different sets of data packets can be directed to each of the dataplanes. In FIG. 5 only the packets from primary dataplane 504 are transmitted to port 0 510 and port 1 512, which is reflective of the normal mode 404 and verification mode 406. In scale-out mode 412, however, both dataplanes will process and transmit packets from the network component/device implemented using the dual dataplane architecture 500. Additionally, throughout the promotion mode 410, the "New Primary" dataplane (i.e., shadow dataplane 506) can gracefully transition from not sending packets to the ports to being the only of the two dataplanes that is sending packets to the ports. Control signal flow between the control-plane agent 508 and the packet dispatchers 502, primary dataplane 504, and shadow dataplane 506. Further, control signal can flow from primary dataplane 504 to shadow dataplane 506.

The dual dataplane architecture 500 includes a shared memory 516 that can be accessed by respective components of the dual dataplane architecture 500, including, e.g., being accessed by the packet dispatcher 502, primary dataplane 504, shadow dataplane 506, and control-plane agent 508. The shared memory 516 enables the dataplanes to operate as stateless as possible by storing state-type information in the shared memory 516, which is accessible by all components of the system. This can allow the packet dispatcher 502 to monitor the performance of both dataplanes. Further, these features can also allow flows to be migrated from one dataplane to the other since the state is isolated.

The shared memory 516 can enable coordination of which of the packets egressing from the primary dataplane and the shadow dataplane are selected as the output packets from the dual dataplane architecture 500. That is, in the validation and promotion modes, the data flows are identical for the primary dataplane and the shadow dataplane. The same packet of the identical data flows is processed by both the primary dataplane and the shadow dataplane, such that upon egress this data packet is added to the output packets from only one of the primary dataplane and the shadow dataplane. During the validation mode, the output packets come entirely from the packets egressing from the primary dataplane. During the promotion mode, the output packets can come from either the primary dataplane or the shadow dataplane, such that over a transition period the output packets transition from egressing from the primary dataplane, at the start of the transition period, to egressing from the shadow dataplane at the end of the transition period. Using the shared memory 516 enables coordination between the primary and shadow dataplanes to ensure that each packet processed along both dataplanes is included once and only once in the output packets, and the shared memory 516 enables a graceful and gradual transition between the output packets originally egressing from the primary dataplane to finally egressing from the shadow dataplane at the end of the transition period. In at least one example, the shared memory 516 enables transitioning from a verification mode to a non-verification mode by gradually increasing, over a transition period, a portion of the output packets that egress from the shadow dataplane.

The dual dataplane architecture 500 uses several functions to realize the various modes. For example, the network devices can be deployed on high availability (HA), and, more particularly, two modes of high availability (HA) can be used: (i) active/standby HA between the dataplanes (e.g., when in the Normal Mode active/standby HA is used with the primary dataplane in active HA and the shadow dataplane in standby HA) and (ii) active/active HA between the dataplanes (e.g., when in the Scale-out Mode active/active HA is used with both the primary dataplane and the shadow dataplane in active HA).

For example, when the network device is a firewall, operating in active/standby HA entails that the first firewall processes all the traffic, and the second firewall, which is a clone of the first firewall, is waiting to take over. Continuing the non-limiting firewall example, operating in active/active HA entails both the first firewall and the second firewall are active (i.e., processing traffic). For example, half the traffic can be sent to the first firewall and the remaining half the traffic can be sent to the second firewall, thereby leveraging all of the compute on that system.

Another function enabled by the dual dataplane architecture 500 is mirroring the packets to the shadow dataplane by sending replicas of the packets through both dataplanes. Because replicas of the packets are used through both dataplanes, this function is used in the verification mode to allow an apples-to-apples type comparison for verification testing between the current version of the network-device software, which is operating on the shadow dataplane. Based on this comparison, the system can tell if the new network software (or new network policy) satisfies predefined verification criteria and passes the verification test to replace the old network software (or old network policy).

Another function enabled by the dual dataplane architecture 500 is gracefully transitioning flows from the "Old Primary" to "New Primary" dataplane (e.g., in the promotion mode).

These functions are enabled (in part) by: (i) keeping the dataplanes as stateless as possible and (ii) storing state-type information in a shared memory that is accessible by all components of the dual dataplane architecture 500. This allows the packet dispatcher 502 to monitor the performance of both dataplanes. This also allows flows to be migrated from one dataplane to the other because the state is isolated.

Additionally, the dataplanes can share additional components. For example, the dataplanes can share a common random number generator. Consider the case in which the dataplanes are used when performing men-in-the-middle interception of TLS sessions. In this case, a secret key is generated, and the key should be the same value for both dataplanes so that the traffic can be mirrored through both data planes. That is, the dataplanes need to generate the identical key, so that they can understand the resulting response in the TLS session. The keys are generated using a random number from a random number generator. Accordingly, by using the same random number from a common random generator, the dataplanes can generate the same unique key for TLS or similar processes.

Figure 6:
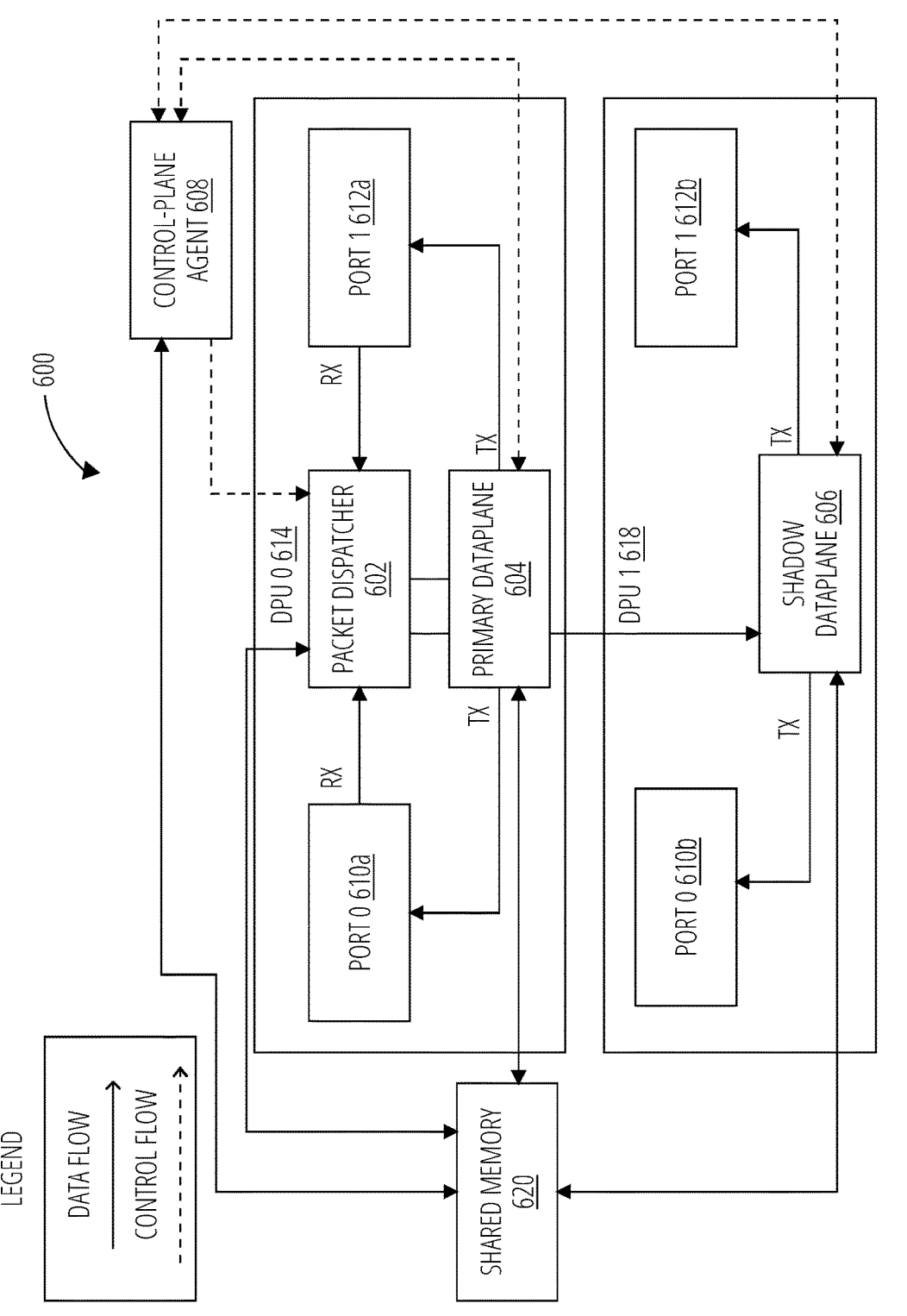
FIG. 6 illustrates a block diagram of a second example of implementing dual dataplanes in data processing units (DPUs), in accordance with certain embodiments.

FIG. 6 illustrates a non-limiting example of a DPU dual dataplane architecture 600. To realize the various modes (e.g., normal mode 404, verification mode 406, promotion mode 410, and scale-out mode 412), the DPU dual dataplane architecture 600 uses the same (or similar) functions as the dual dataplane architecture 500 to realize the various modes.

For example, the network devices can be deployed on high availability (HA), and, more particularly, two modes of high availability (HA) can be used: (i) active/standby HA between the dataplanes (e.g., when in the Normal Mode active/standby HA is used with the primary dataplane in active HA and the shadow dataplane in standby HA) and (ii) active/active HA between the dataplanes (e.g., when in the Scale-out Mode active/active HA is used with both the primary dataplane and the shadow dataplane in active HA).

Descriptions of the functions and how they enable the respective modes of the DPU dual dataplane architecture have been provided above, in reference to FIG. 5, and therefore these descriptions are not repeated here. Some differences between the dual dataplane architecture 500 and the DPU dual dataplane architecture 600 are noted here. Generally, in the promotion mode, the graceful transition of packet flows from the "Old Primary" dataplane to the "New Primary" dataplane is enabled by keeping the dataplanes as stateless as possible and the storing state is provided in a shared memory that is accessible by all components of the system, thereby allowing the dispatcher to monitor the performance of both dataplanes. Further, these features can also allow flows to be migrated from one dataplane to the other since the state is isolated.

The DPU dual dataplane architecture 600 includes a shared memory 620 that can be accessed by respective components of the DPU dual dataplane architecture 600, including, e.g., being accessed by the packet dispatcher 602, primary dataplane 604, shadow dataplane 606, and control-plane agent 608. The shared memory 620 enables the dataplanes to operate as stateless as possible by storing state-type information in the shared memory 620, which is accessible by all components of the system. This can allow the packet dispatcher 602 to monitor the performance of both dataplanes. Further, these features can also allow flows to be migrated from one dataplane to the other since the state is isolated.

In DPU environments, however, it may not be possible for the dataplanes to run entirely stateless, e.g., when leveraging hardware acceleration. To address this difference, during the promotion mode, session re-establishment may be used, resulting in a truly graceful promotion mode taking longer in the DPU dual dataplane architecture 600 than in the dual dataplane architecture 500.

As illustrated in FIG. 6, ingress packets are received through port 0 610a and port 1 612a of DPU 0 614, and then the ingress packets are transmitted from the respective ports to the packet dispatcher 602. The packet dispatcher 602 then selects which of these data packets to direct to the primary dataplane 604 and which to the shadow dataplane 606. For example, in verification mode 406 the packets can be mirrored such that identical replicas are sent to both dataplanes. In contrast, in the scale-out mode 412, different sets of data packets can be directed to each of the dataplanes. In FIG. 6 only the packets from the primary dataplane 604 are transmitted to port 0 610a and port 1 612a of DPU 0 614, and the packets from the shadow dataplane 606 are transmitted to port 0 610b and port 1 612b of DPU 1 618.

Depending on which mode the DPU dual dataplane architecture 600 is in, packets might not be sent to DPU 1 618, and, even when the packets are sent to and processed by DPU 1 618, the packets might not be transmitted from the ports of DPU 1 618 (i.e., port 0 610b and port 1 612b). For example, in the normal mode 404, the shadow dataplane 606 is in standby and does not receive any data packets. In contrast, in scale-out mode 412, the shadow dataplane 606 is active, and both DPUs are engaged in processing and sending packets from their respective ports. Further, in verification mode 406, however, packets that are identical replicas are sent to and processed by both dataplanes, but only DPU 1 618 transmits the processed packets from its ports.

In the promotion mode 410, there can be a gradual transition over time that starts with DPU 0 614 transmitting the processed packets and end with DPU 1 618 transmitting the processed packets. Accordingly, throughout the promotion mode 410, the "New Primary" dataplane (i.e., shadow dataplane 606) can gracefully transition from not sending packets to the ports to being the only of the two dataplanes that is sending packets to the ports.

Control signals can flow between the control-plane agent 608 and each of the packet dispatcher 602, the primary dataplane 604, and the shadow dataplane 606.

FIG. 7A and FIG. 7B illustrate a non-limiting scaling up the system to more than two dataplanes. Generally, the total number of dataplanes can be any number N. In this example, the total number of dataplanes is N=8, but a person of ordinary skill in the art will recognize that any number of dataplanes can be used. When pairwise dataplanes are used, the number of dataplanes can be even, such that when in verification mode 406 each primary dataplane is mirrored by a corresponding shadow dataplane. However, a primary dataplane can also be mirrored by more than one shadow dataplane (e.g., a first shadow dataplane that is implementing a first new version and a second shadow dataplane that is implementing a second new version).

FIG. 7A illustrates pairwise dataplanes. when in a first configuration 700a (e.g., a normal mode 404, a verification mode 406, or a promotion mode 410), each primary dataplane is mirrored by a corresponding shadow dataplane. That is, when in first configuration 700a first primary dataplane 702a, second primary dataplane 702b, third primary dataplane 702c, and fourth primary dataplane 702d are mirrored by first shadow dataplane 704a, second shadow dataplane 704b, third shadow dataplane 704c, and fourth shadow dataplane 704d, respectively.

FIG. 7B illustrates a non-limiting example of a scale-out-mode configuration 700b for eight dataplanes. When in the scale-out-mode configuration 700b the first primary dataplane 702a, second primary dataplane 702b, third primary dataplane 702c, and fourth primary dataplane 702d can remain the same as in the first configuration 700a. The shadow dataplanes are, however, converted to primary dataplanes, as in the dual dataplane examples discussed above. That is, the first shadow dataplane 704a, second shadow dataplane 704b, third shadow dataplane 704c, and fourth shadow dataplane 704d, respectively become reassigned to fifth primary dataplane 706a, sixth primary dataplane 706b, seventh primary dataplane 706c, and eighth primary dataplane 706d, respectively.

Thus, this system can be extended to any number N dataplanes where (N % 2==0). For example, in an implementation using a cluster of 8 DPUs is deployed in a top-of-rack switch, the system operates by creating four pairs of dual dataplanes.

FIG. 8 illustrates an example promotion method 800 for promoting an upgrade from the shadow dataplane to the primary dataplane (i.e., the promotion mode). That is, in a multi-dataplane system, promotion method 800 is performed after the upgrade has passed the verification testing to promote the upgrade to perform a network function by using the upgrade to generate the transmitted egress data packets from the network component/device to subsequent/downstream device in a network or data center, for example. Although the example promotion method 800 depicts a particular sequence of operations, the sequence may be altered without departing from the scope of the present disclosure. For example, some of the operations depicted may be performed in parallel or in a different sequence that does not materially affect the function of the promotion method 800. In other examples, different components of an example device or system that implements the promotion method 800 may perform functions at substantially the same time or in a specific sequence.

According to some examples, at step 802, the promotion method 800 includes receiving ingress data packets at a network component/device and performing a network function on the ingress data packets to generate transmitted egress data packets (e.g., the network component can include dual dataplanes with a first (primary) dataplane and a second (shadow) dataplane. The network component can also include multiple shadow dataplanes per primary dataplane, and there can be multiple primary dataplanes with multiple shadow dataplanes, as illustrated in FIG. 7A and FIG. 7B.

According to some examples, step 804 of the promotion method 800 includes selecting, using a packet dispatcher, which of the received ingress data packets are directed respectively to the first and second data planes. For example, in the verification mode, matching sets of ingress data packets are sent to the first and second dataplanes, but, in the scale-out mode, different sets of ingress data packets are sent to the first and second dataplanes.

According to some examples, at step 806, the method includes that each of the dataplanes processes the selected ingress data packets using the logical instructions corresponding to the respective dataplane. For example, in the verification mode the first logical instructions of the first dataplane can be current policies/programs, whereas the second logical instructions performed by the second dataplane can be upgrades to the policies/programs. Further, in the scale-out mode the first logical instructions of the first dataplane can be the current policies/programs, and the second logical instructions performed by the second dataplane can be the current policies/programs.

According to some examples, at step 808, the method includes generating the first egress data packets as a result of the first dataplane processing the first ingress data packets using the first logical instructions. Further, the method includes generating the second egress data packets as a result of the second dataplane processing the second ingress data packets using the second logical instructions.

According to some examples, at step 810, the promotion method 800 includes selecting transmitted egress data packets from between the first egress data packets and the first egress data packets.

According to some examples, at step 812, the method includes transition from the verification mode to a non-verification mode (e.g., normal mode or scale-out mode) by, switching, over a predefined period, from selecting the first egress data packets as the transmitted egress data packets to selecting the second egress data packets as the transmitted egress data packets.

According to some examples, at step 814, the method includes monitoring, the transition for potential problems, and, when a potential problem occurs, roll back to the transmitted egress data packets being selected entirely from the first egress data packets. For example, a controller can monitor, throughout the transition period, the transmitted egress data packets and/or the performance of the network for a deviation from a predefined specification (e.g., undesired dropped packets or packets being transmitted that should have been prevented). When there is a deviation, the network component can be rolled back to the pre-upgrade configuration by selecting the transmitted egress data packets entirely from the first egress data packets.

Figure 9A:
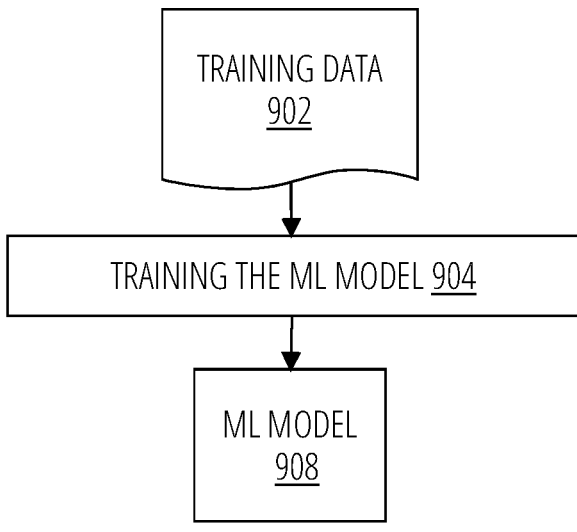
FIG. 9A illustrates a flow diagram for an example of a method of training an artificial intelligence (AI) engine, in accordance with certain embodiments.

FIG. 9A illustrates an example of training an ML model 908. In training step 904, training data 902 (i.e., a corpus of verification metadata) is applied to train the ML model 908. For example, the ML model 908 can be an artificial neural network (ANN) that is trained via supervised or unsupervised learning using a backpropagation technique to train the weighting parameters between nodes within respective layers of the ANN.

In supervised learning, the training data 902 is applied as an input to the ML model 908, and an error/loss function is generated by comparing the output from the ML model 908 with the desired output (e.g., a known prediction or label associated with the training data 902). The coefficients of the ML model 908 are iteratively updated to reduce an error/loss function. The value of the error/loss function decreases as outputs from the ML model 908 increasingly approximate the desired output. In other words, ANN infers the mapping implied by the training data, and the error/loss function produces an error value related to the mismatch between the desired output and the outputs from the ML model 908 that are produced as a result of applying the training data 902 to the ML model 908.

Alternatively, for unsupervised learning or semi-supervised learning, training data 902 is applied to train the ML model 908. For example, the ML model 908 can be an artificial neural network (ANN) that is trained via unsupervised or self-supervised learning using a backpropagation technique to train the weighting parameters between nodes within respective layers of the ANN.

In unsupervised learning, the training data 902 is applied as an input to the ML model 908, and an error/loss function is generated by comparing the predictions of the next word in a text from the ML model 908 with the actual word in the text. The coefficients of the ML model 908 can be iteratively updated to reduce an error/loss function. The value of the error/loss function decreases as outputs from the ML model 908 increasingly approximate the training data 902.

For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods and particle swarm optimization, can also be used for training the ML model 908.

The training step 904 of the ML model 908 can also include various techniques to prevent overfitting to the training data 902 and for validating the ML model 908. For example, bootstrapping and random sampling of the training data 902 can be used during training.

Further, other machine learning (ML) algorithms can be used for the ML model 908, and the ML model 908 is not limited to being an ANN. For example, there are many machine-learning models, and the ML model 908 can be based on machine-learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 9B:
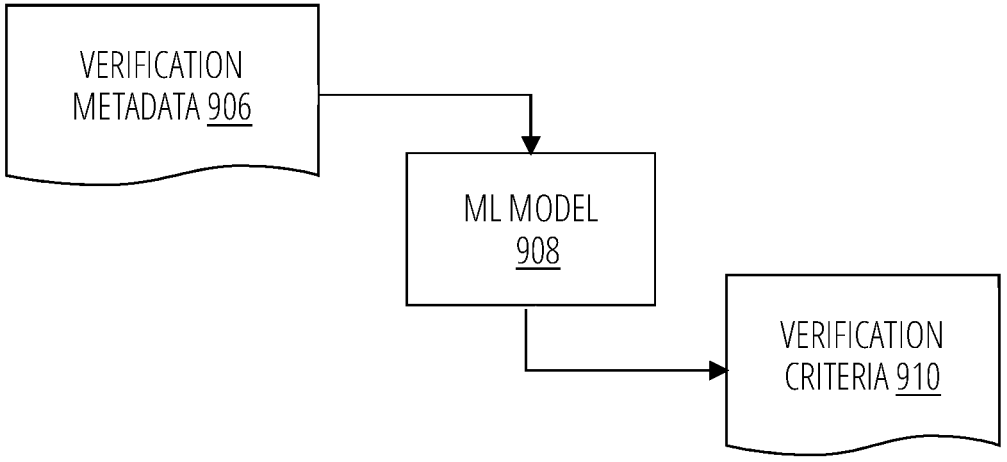
FIG. 9B illustrates a flow diagram for an example of a method of using the trained ML model, in accordance with certain embodiments.

FIG. 9B illustrates an example of using the ML model 908. The verification metadata 906 is applied to the ML model 908 to generate various outputs, which can include the verification criteria 910.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a system and performs one or more functions when a processor executes the software associated with the service. In some embodiments, a service is a program or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

receiving ingress packets at a network component that performs a network function to generate output packets, the network component comprising a first dataplane and a second dataplane, wherein the first dataplane executes first instructions on first ingress packets to provide packets egressing from the first dataplane, the second dataplane executes second instructions on second ingress packets to provide packets egressing from the second dataplane, and, when in a verification mode, the first dataplane is a primary dataplane and the second dataplane is a shadow dataplane;

selecting the output packets from the packets egressing from the first dataplane and the packets egressing from the second dataplane, wherein, when in a verification mode, the output packets egressing from the primary dataplane;

transmitting the output packets; and transitioning from a verification mode to a non-verification mode by gradually increasing, over a transition period, a portion of the output packets that egress from the second dataplane.

2. The method of claim 1, wherein transitioning from the verification mode to the non-verification mode comprises:

using a shared memory between the first dataplane and the second dataplane to coordinate which of the packets egressing from the first dataplane and the second dataplane are included in the output packets; and dropping the packets egressing from the first dataplane and the second dataplane that are not included as the output packets.

3. The method of claim 1, wherein transitioning from the verification mode to the non-verification mode further comprises:

providing, by a packet dispatcher, the first ingress packets to the first dataplane that are identical to the second ingress packets provided to the second dataplane.

4. The method of claim 1, wherein after transitioning from the verification mode to the non-verification mode, when in the non-verification mode, all of the output packets have been processed by the network function being performed using second instructions, and before transitioning from the verification mode to the non-verification mode, when in the verification mode, all of the output packets have been processed by the network function being performed using the first instructions.

5. The method of claim 1, wherein after transitioning from the verification mode to the non-verification mode, the second dataplane operates as the primary dataplane.

6. The method of claim 5, wherein after transitioning from the verification mode to the non-verification mode, the network component operates in a normal mode by ceasing to process data packets through the first dataplane.

7. The method of claim 1, wherein after transitioning from the verification mode to the non-verification mode, the network component operates in a scale-out mode by:

reconfiguring the first dataplane to perform the network function using the second instructions;

providing, by a packet dispatcher, the first ingress packets to the first dataplane and the second ingress packets to the second dataplane, wherein the first ingress packets are different from the second ingress packets; and selecting as the output packets both the packets egressing from the first dataplane and the packets egressing from the second dataplane.

8. The method of claim 1, wherein transitioning from the verification mode to the non-verification mode is performed without interrupting a data-traffic flow being transmitted from the network component to another network component, the data-traffic flow comprising the output packets transmitted from the network component.

9. The method of claim 8, further comprising:

monitoring, during the transition period, the output packets for a deviation from a predefined specification; and rolling back to the output packets egressing from the first dataplane, when the deviation from the predefined specification is detected.

10. The method of claim 1, wherein the network component is either implemented on one or more data processing units (DPUs) or implemented as software executed on one or more central processing units (CPUs), and the network function comprises data-packet filtering, load balancing, security screening, malware detection, firewall protection, data-packet routing, data-packet switching, data-packet forwarding, computing header checksums, or implementing network policies.

11. The method of claim 1, wherein the network component is configured in an embedded device of a network edge, and the network component comprises instructions executed in a data processing unit (DPU) or an extended Berkley packet filter (eBPF).

12. The method of claim 1, wherein the first instructions comprise a first network policy, and the second instructions comprise an update to the first network policy, or the first instructions comprise software for executing the network function, and the second instructions comprise an upgrade to the software for executing the network function.

13. A network component comprising:

a first dataplane executing first instructions on first ingress packets to provide packets egressing from the first dataplane;

a second dataplane executing second instructions on second ingress packets received at the second dataplane to provide packets egressing from the second dataplane;

a processor;

a memory communicably coupled to the first dataplane, the second dataplane and the processor, wherein the memory is configured to store instructions that, when executed by the processor, configure the network component to:

receive ingress packets at a network component that performs a network function to generate output packets;

select the output packets from the packets egressing from the first dataplane and the packets egressing from the second dataplane;

transmit the output packets; and transitioning from a verification mode to a non-verification mode by gradually increasing, over a transition period, a portion of the output packets that egress from the second dataplane, wherein when in a verification mode, the first dataplane is a primary dataplane and the second dataplane is a shadow dataplane, and the output packets egressing from the primary dataplane.

14. The network component of claim 13, wherein the instructions further configure the network component to:

use the memory, which is communicable coupled to both the first dataplane and the second dataplane, to coordinate which of the packets egressing from the first dataplane and the second dataplane are selected as the output packets and dropping the packets egressing from the first dataplane and the second dataplane that are not selected as the output packets.

15. The network component of claim 13, further comprising:

a packet dispatcher configured to provide the first ingress packets to the first dataplane and the second ingress packets provided to the second dataplane, wherein, during the transition period, the first ingress packets are identical to the second ingress packets.

16. The network component of claim 13, wherein after transitioning from the verification mode to the non-verification mode, when in the non-verification mode, all of the output packets have been processed by the network function being performed using second instructions, and before transitioning from the verification mode to the non-verification mode, when in the verification mode, all of the output packets have been processed by the network function being performed using the first instructions.

17. The network component of claim 13, wherein the instructions further configure the network component to:

operate the network component in a scale-out mode by:

reconfiguring the first dataplane to perform the network function using the second instructions;

providing, by a packet dispatcher, the first ingress packets to the first dataplane and the second ingress packets provided to the second dataplane, wherein the first ingress packets are different from the second ingress packets; and selecting both the packets egressing from the first dataplane and the packets egressing from the second dataplane as the output packets.

18. The network component of claim 13, wherein the instructions further configure the network component to:

transition from the verification mode to the non-verification mode without interrupting a data-traffic flow being transmitted from the network component to another network component, the data-traffic flow comprising the output packets transmitted from the network component.

19. The network component of claim 13, wherein the instructions further configure the network component to:

monitor, during the transition period, the output packets for a deviation from a predefined specification; and roll back to the output packets egressing from the first dataplane, when the deviation from the predefined specification is detected.

20. The network component of claim 13, wherein the network component is either implemented on one or more data processing units (DPUs) or implemented as software executed on one or more central processing units (CPUs), and the network function comprises data-packet filtering, load balancing, security screening, malware detection, firewall protection, data-packet routing, data-packet switching, data-packet forwarding, computing header checksums, or implementing network policies.

* * * * *